United States Patent [19]

Joël

[11] 4,360,713
[45] Nov. 23, 1982

[54] ECHO DETECTOR PARTICULARLY FOR SPEECH INTERPOLATION COMMUNICATION SYSTEMS

[76] Inventor: Soumagne Joël, 2560 Rue Troyes, Sherbrooke, Quebec, Canada, J1K 1W9

[21] Appl. No.: 128,384

[22] Filed: Mar. 10, 1980

[30] Foreign Application Priority Data

Dec. 3, 1979 [FR] France ............................. 79 06671

[51] Int. Cl.³ .............................................. H04B 3/20
[52] U.S. Cl. ............................... 179/170.2; 179/170.8
[58] Field of Search ................. 179/170.2, 170.6, 170.8

[56] References Cited

U.S. PATENT DOCUMENTS

| | | | |
|---|---|---|---|
| 3,942,116 | 3/1976 | Ferguson | 179/170.6 |
| 4,005,276 | 1/1977 | Abramson et al. | 179/170.2 |
| 4,064,379 | 12/1977 | Horna | 179/170.2 |
| 4,123,626 | 10/1978 | Munter | 179/170.2 |

OTHER PUBLICATIONS

A. Molinari; "Bitrate Per Channel Halving in PCM Multiplexes by Speech Interpolation and Adaptive Quantization;" IEEE International Zurich Seminar on Digital Communications Mar. 9–11, 1976; pp. A7.-1–A7.8.

Primary Examiner—Gene Z. Rubinson
Assistant Examiner—Randall P. Myers
Attorney, Agent, or Firm—Laff, Whitesel, Conte & Saret

[57] ABSTRACT

An echo detector which is able to distinguish a speech signal echo on the outgoing channel without reference to the signal received at the incoming channel. The echo detector is comprised of a circuit for digital differential coding in which the error signal between the incoming signal and the predicted signal is divided by the average value of a certain number of samples of previously received incoming signals, having sign according to the second-last received sample, the quotient obtained in this first division being again divided by the average value of a certain number of such quotients previously computed, the logarithm to base 2 of the average value for the entering signal samples and the logarithm to base 2 of the average value of the quotients, for which only the integer portion is kept, forming for each treated sample two values defining one point of a matrix of points, a first counter counting for a number of sets of two values for which the corresponding points are above or on the secondary diagonal of the matrix, a second counter counting simultaneously the number of sets of values for which the corresponding points are below or on the above-mentioned secondary diagonal, a divider carrying out the quotient of the counts from the first and the second counter, this quotient being compared to a predetermined value to decide, if it is greater than this value, that the entering signal is an echo and not an information signal.

4 Claims, 7 Drawing Figures

COMPUTATION DECISION

ECHO DETECTOR PARTICULARLY FOR SPEECH INTERPOLATION COMMUNICATION SYSTEMS

The present invention relates to an echo detector which is particularly usable in communication systems which use the speech interpolation principle.

In long distance telephone communications, we conventionally use one outgoing channel and one return channel per call which are in the neighborhood of each respective subscriber terminal connected to a more or less perfect hybrid circuit. This results in the well known phenomenon of echo, that is the hybrid circuit retransmits on one channel part of the energy which it receives from the other channel. When, for a given number of calls, there exists twice as many transmission channels in the network, with an equal number of channels in each direction of transmission, the echo phenomenon is not of fundamental importance. In fact, generally the level of the echo is low and the two-way transmit time is often small, of the order of a few milliseconds, so that the subjective effect perceived by the speaker is nil, when he listens to his own voice being returned by the echo phenomenon.

However, in a speech interpolation communication system, we must identify the eventual presence of echo and, if it exists, suppress it. We know that, in a speech interpolation system, we use conversation rest periods to allocate the transmission channel, during these rest periods, to conversations in an active period. In these systems we use speech detectors and silence detectors to locate on each circuit the transitions of activity and rest. However, with the presence of an echo on a circuit, the silence detector may not be able to detect genuine silences when the associated subscriber is in fact the listener. That is why it is necessary to provide echo suppressors.

The known echo suppressors in the field are circuits connected in shunt between the four-wire inputs of a hybrid circuit, divert part of the incoming speech signal, attenuate it, delay it by a fixed quantity, change its sign and finally apply it in opposition on the outgoing channel in such a way as to cancel the eventual echo by compensation. Clearly, the attenuation and the delay are chosen as a function of the hybrid circuit. In practice, these echo suppressors are relatively complex circuits which do not have complete efficiency.

One object of the present invention is to provide a circuit which is able to distinguish a speech signal echo on the outgoing channel without referring to the signal received on the incoming signal.

Another object of the invention is to provide a very simple circuit which can use directly the digital values present in differential PCM coders generally used to reduce the digital throughout to be transmitted, in particular in these coders linear second order predictors or sinusoidal predictors are used.

By way of example, a coder of this type has been described in the French patent application having national registration number 78 34709 applied for by the present applicant on the Nov. 27, 1978 under the title "Methods and Means of Differential Digital Coding with Automatic Code Switching".

In accordance with a feature of the present invention, an echo detector is provided comprised of a circuit for digital differential coding in which the error signal between the incoming signal and the predicted signal is divided by the average value of a certain number of samples of previously received incoming signals, having sign according to the second-last received sample, the quotient obtained in this first division being again divided by the average value of a certain number of such quotients previously computed, the logarithm to base 2 of the average value for the entering signal samples and the logarithm to base 2 of the average value of the quotients, for which only the integer portion is kept, forming for each treated sample two values defining one point of a matrix of points, a first counter counting for a certain number of entering samples the number of sets of two values for which the corresponding points are above or on the secondary diagonal of the matrix, a second counter counting simultaneously the number of sets of values for which the corresponding points are below or on the above-mentioned secondary diagonal, a divider carrying out the quotient of the counts from the first and the second counter, this quotient being compared to a predetermined value to decide, if it is greater than this value, that the entering signal is an echo and not a direct signal.

In accordance with another feature, the above-mentioned predetermined value is equal to 2.

In accordance with another feature, the echo detector has two pairs of first and second counters which are used alternately, the quotient of one pair being compared to said predetermined value during a predetermined period of time while the counters of the second pair accumulate values after having been reset to zero at the beginning of said time period, and during a second period the quotient of the second pair is being compared while the counters of the first pair accumulate values after having been reset to zero, and so on.

Another object of the present invention consists of determining a magnitude defining by the speech frequency on the incoming channel and of determining the corresponding magnitude on the outgoing channel, comparing them, and when the comparison is positive, deciding that it is an echo on the outgoing channel.

As a feature of the present invention an echo suppressor is provided having a differential digital coding circuit on each incoming and outgoing channel, the coding circuit having a second order linear predictor, in which the error signal is divided by the average value of a certain number of samples of the entering signal previously received, having sign according to the second last sample received, the quotient obtained being applied to a circuit which calculates an average based on a certain number of quotients, the output signal from a computing circuit for a coder being compared with the output signal from the computing circuit for the other coder, a positive or negative result indicating if on the outgoing channel there is an echo or a direct speech signal.

As another feature, the coder circuits can be coding or decoding circuits used in other respects for the transmission and reception of differential PCM signal.

The features of the above-mentioned invention as well as others, will become more clear upon reading the description of the following embodiments, the said description being made in conjunction with the accompanying drawings, in which.

Figure 1:
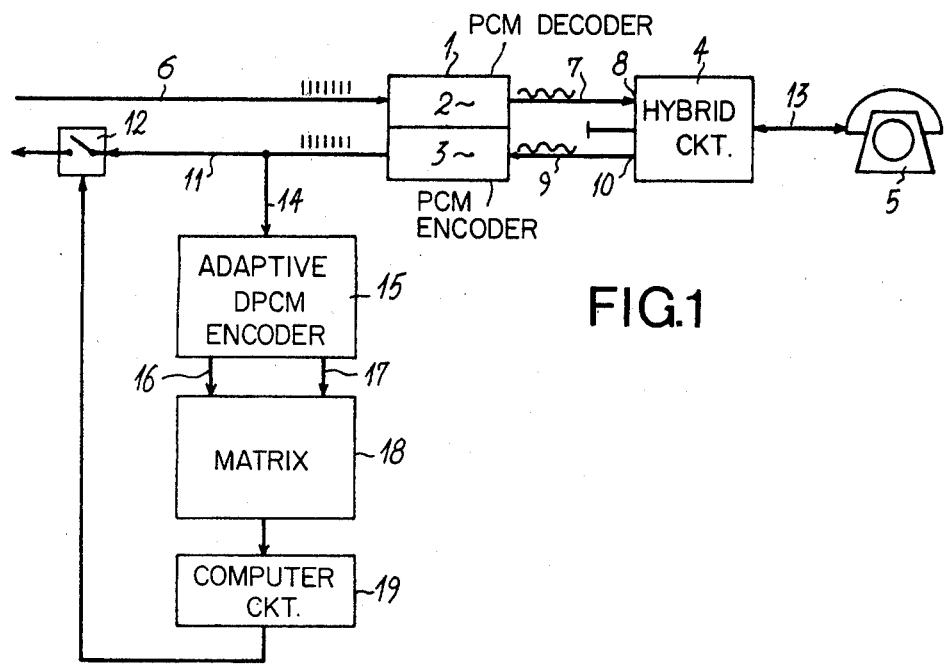
FIG. 1 is a block diagram indicating, in a general fashion, the set-up of a first embodiment of an echo detector according to the invention.

The terminal equipment of FIG. 1 is comprised of an assembly 1 made up of one digital PCM signal decoder 2 and one digital PCM signal coder 3, one 4 wire/2 wire coupler 4 and one subscriber telephone station 5. The input to the decoder 2 is connected to a PCM return link 6 while the output is connected by a pair 7 to one input 8 of the coupler 4. The input of coder 3 is connected by a pair 9 to the output 10 of coupler 4 while its output is connected to a PCM forwarding link 11, on which is installed a switch 12. The subscriber station 5 is connected to the hybrid coupler 4 by a pair 13.

The PCM link 11 has one tap 14 going to circuit 15 operating as an adaptive differential PCM coder and having two outputs 16 and 17 respectively connected to the inputs of a matrix 18 whose output is connected to the input of a computing circuit 19. The output of 19 is connected to the control input of switch 12.

Figure 2:
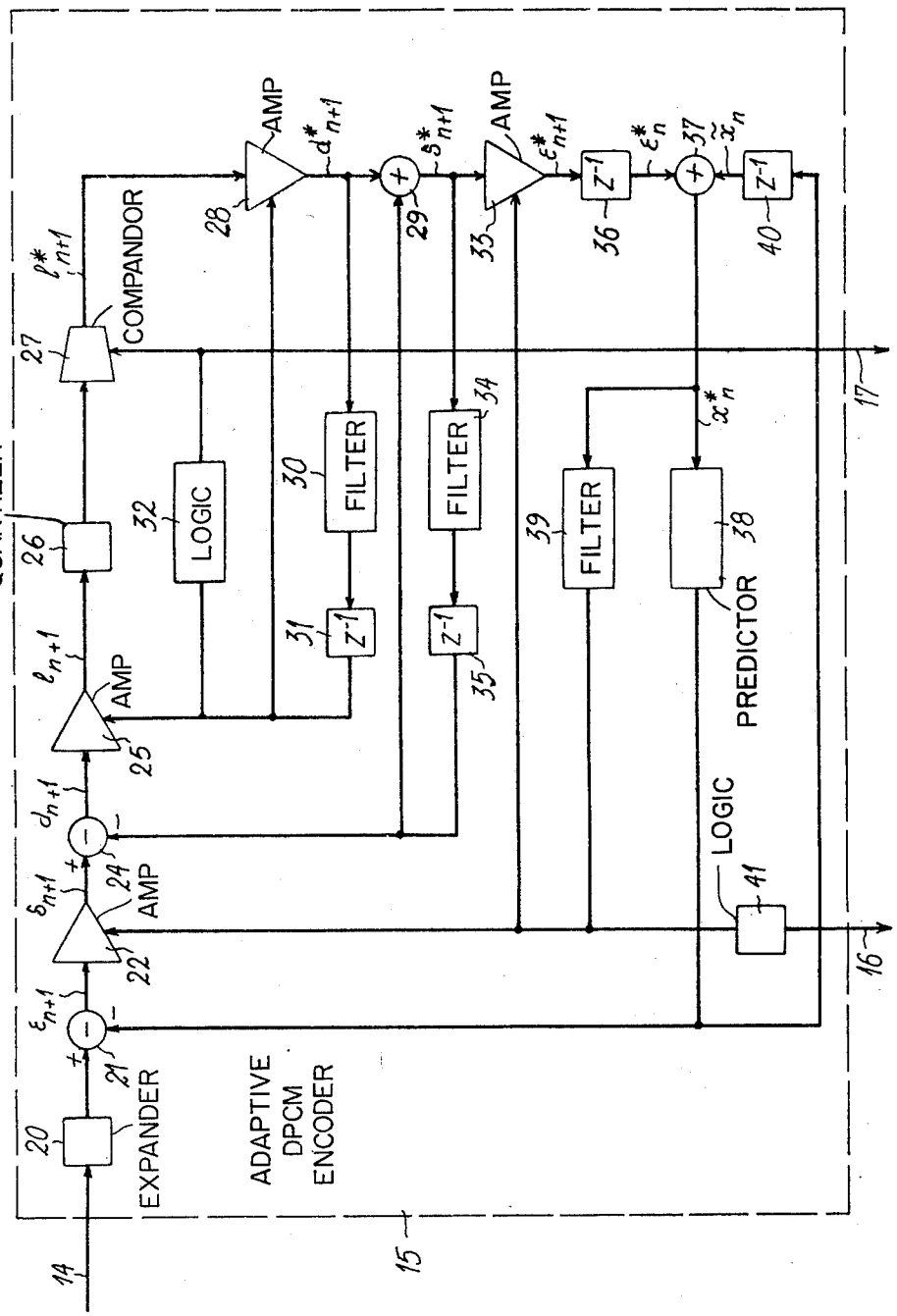
FIG. 2 is the block diagram of a differential coder used in the echo detector of FIG. 1.

Circuit 15 is shown in the form of a block diagram in FIG. 2. The signals of tap 14, which are 8 binary element or bit PCM signal, with conventional logarithmic scaling, are applied to the input of an expander 20 which reconstructs, as its output, a 12 bit signal with linear scaling of which algebraic operations can be carried. The output of expander 20 is connected to the + input of subtracting circuit 21 the output of which is connected to the input of an amplifier 22 with controlled variable gain whose output is connected to the + input of a subtracting circuit 24. The output of 24 is connected to the input of an amplifier 25 with controlled variable gain whose output is connected to the input of a quantizer 26. The output of 26 is connected to the input of a compressor 27 whose output is connected to the input of an amplifier 28 with controlled variable gain.

The output of amplifier 28 is connected, on one hand, to the input of an adder 29 and, on the other hand, to the input of an averaging filter 30 whose output is connected to the input of a delay circuit 31 whose delay is equal to one sampling period. The output of circuit 31 is connected, on one hand, to the gain control input of amplifier 25, on the other hand, to the gain control input of amplifier 28, and finally to the input of a logic circuit 32 whose output is connected to the control input of compressor 27.

The output of adder 29 is connected, on one hand, to the input of amplifier 33 with a gain control and, on the other hand, to the input of an averaging filter 34 whose output is connected to the input of a delay circuit 35, with the same delay as 31. The output of circuit 35 is connected, on one hand, to the −input of subtractor 24, and on the other hand, to the second input of adder 29.

The output of amplifier 33 is connected to the input of a delay circuit 36 whose output is connected to one input of an adder 37. The output of 37 is connected, on one hand, to the input of a predictor 38, and on the other hand, to the input of an averaging filter 39. The output of 39 is connected, on one hand, to the gain control input of amplifier 22 and, on the other hand to the control input of amplifier 33.

The output of predictor 38 is connected, on one hand, to the −input of subtractor 21, and on the other hand, to the input of a delay circuit 40 whose output is connected to the second input of adder 37.

As in all differential coders, subtractor 21 receives, at time $(n+1)T$, at its + input the signal $\tilde{x}_{n+1}$ from expander 20 and at its − input the signal $x_{n+1}$ from predictor 38. It produces signal $\epsilon_{n+1}$ which represents an evaluation of the difference between the prediction and the real signals. In amplifier 22, the signal $\epsilon_{n+1}$ is multiplied by the gain $1/X_n$, $X_n$ being the value of the output signal from filter 39, the significance of which will be given later. The subtractor 24 receives at its + input the signal $\delta_{n+1}$ coming from 22 and at its − input the signal $\bar{\delta}_n$ coming from filter 34, by means of delay circuit 35. The subtractor 24 yields signal $d_{n+1}$ which, in amplifier 25, is multiplied by the gain $1/D_n$, $D_n$ being the value of the output signal of filter 30, delayed by delay circuit 31.

The significance of the value $D_n$ will be given below. Amplifier 25 yields the signal $l_{n+1}$ which is quantized in quantizer 26, then compressed in compressor 27, which yields the signal $l^*_{n+1}$.

The signal $l^*_{n+1}$ is multiplied by the gain $D_n$ from amplifier 28 which yields the quantized signal $d^*_{n+1}$. Adder 29 receives at one input the signal $d^*_{n+1}$ and its other input the signal $\bar{\delta}_n$, and yields the signal $\delta^*_{n+1}$. Amplifier 33 multiplies the signals $\delta^*_{n+1}$ by its gain $X_n$ and yields the signal $\epsilon^*_{n+1}$. When the delay circuit 36 receives the signal $\epsilon^*_{n+1}$, it yields the signal $\epsilon^*_n$. When the circuit 40 receives the signal $\tilde{x}_{n+1}$, it yields the signal $\tilde{x}_n$. Thus, adder 37, which receives at one of its inputs the signal $\epsilon^*_n$ and at its other input the signal $x_n$, yields the signal $x^*_n$.

The predictor 38 is a second order linear predictor which yields the forecasted sample $\tilde{x}_{n+1}$ according to the following formula:

$$\tilde{x}_{n+1} = 2x^*_n - x^*_{n-1} \tag{1}$$

The filter 30 is a filter for calculating the average amplitude of signals applied thereto, following by a quantizer whose output levels are powers of 2, e.g. $2^k$. It will be recalled that an averaging or average estimating filter is a circuit which can compute the average of the last P samples given to it from the signal, P being a predetermined number which defines the window width of the filter. In the embodiment described, P can be chosen equal to 64, which, given the sampling period of 125 microseconds, corresponds to a period of time over which the average is taken, of 8 milliseconds, that is a duration of the order of the average excitation time of the vocal cords. Instead of using the output value of this filter directly, it is preferred to quantize it in such a way as to obtain a signal $D_{n+1}$ of the form $2^k$. It is understood that circuit 31 which delays by one period yields, at the same instant, the quantized signal $D_n$.

The amplifiers 25 and 28 are simple registers in which multiplication by a number equal to a power of 2 becomes a simple right shift in 25 and a left shift in 28.

The binary words which are generated by the quantizer 26 represent, according to a linear scale of measurement, an amplitude preceeded by a sign. In fact if $l_{n+1}$ is known with 12 bits, that is $2048 = 2^{11}$ possible amplitude values, the quantization in 26 with $2^8$ levels will select $2^7$ amplitude values from the 2048, the output words from 26 being again defined with a length of 12 bits.

At the output quantizer 26, the compressor 27 carries out a reduction to $2^M$, with M an integer which can vary between 3 and 8, the number of possible values for the output words of 26, M being defined by the output signal from logic circuit 32. The output words of compressor 27 are again expressed with 12 bits, but their values occupy only $2^{M-1}$ of the possible 2048 levels authorized by these 12 bits.

The logic circuit 32 receives from 31 the words $D_n = 2^k$ and yields the signal $M = k+5$. It is a simple register which enables the location of the binary element "1" from word $D_n$, followed by an adder adding 5 to the rank of this location.

The filter 39 is an averaging filter followed by a quantizer, with a link in parallel enabling tagging the sign of the last input sample to the outgoing average signal.

The averaging filter 39 computes the size $X_n$ which represents, for example on $P=64$ terms, the amplitudes of the last P signals $x^*_n$ which were applied to its input by 37. The quantizer 39 quantizes the signal $X_n$ in powers of 2 to yield a signal 2j tagged by the sign of the last $x^*_n$ input. The quantization of $X_n$ enables great simplification in the structure of the amplifiers 22 and 33. In particular, the signal $\delta_{n+1}$ yielded by 22 is given by the following relationship:

$$\delta_{n+1} = \frac{\epsilon_{n+1}}{X_n \cdot \text{sign of } [x^*_n]} \quad (2)$$

It appears that the variable $\delta_n$ is a normalized variable which presents a reduced dynamic, but it is not a centered variable, that is with zero mean. In fact, for illustrative purpose, for an input signal of sinusoidal form applied to the coder, with the predictor 38 operating according to formula (1), we can show that this variable $\delta_n$ is also a constant contained between 0 and 4, when the frequency of the sinusoidal signal is below 4000 Hz.

The filter 34 is an averaging filter which yields the average value of its applied signals. It receives the signals $\overline{\delta^*_{n+1}}$, can have a window $P=64$, and yields the signal $\overline{\delta_{n+1}}$, which amounts to fixing the value of the sign binary element. Given the delay circuit 35, the signal applied to 24 by 35 is $\delta_n$. As a result the variable $d_{n+1}$ is given by the formula:

$$d_{n+1} = \delta_{n+1} - \delta_n \quad (3)$$

It is thus a centered variable $d_{n+1}$ to which an adaptive quantization is applied by 25, 26 and 27.

The absolute value output of filter 39 is still connected to link 16 leading to the matrix 18 by a circuit 41 which, like circuit 32, receives a signal equal to a power of 2 and yields the value of the exponent, less 4, that is the value referred to below as j.

Finally, the output of circuit 32 is connected to link 17 toward matrix 18.

In practice, the output value M of circuit 32 can be connected to a voicing index Iv per the following formula, with a prior definition:

$$Iv = M \quad (4)$$

We know that, if the coder of FIG. 2 were used as a digital PCM differential coder, the value M would define, in the code word generator, not shown here, which would be connected to the output of 27, the number M of bits in the code word to be transmitted at the receiving end. Of course, when the signal becomes more difficult to predict, more bits per word must be transmitted and the value of M increases. However, we know that voiced type sounds, strongly periodical, with an excitation due to the vocal cords, are easily predictable, which means that the application of voiced sounds to the input of the coder of FIG. 2 results in a low value for M. However, the speech signal of non-voiced type, that is sounds close to a noise signal more or less coloured by the equivalent transfer function of the human mouth are not so well predicted, which means that their application to the input of the coder of FIG. 2 results in a high value for M.

It results from the above that M is connected to the applied signals voicing index, and for the usage made in the echo detector of the invention, we identify M by this index, as indicated by formula (4).

In other respects, we know that the real characteristics of the speech signal assigns the strongest energy to vocal sounds because of the physiological nature of their emission. Now, in the coder of FIG. 2, the output signal of 39 corresponds to the quantized average value for the amplitude of the signal applied at the input.

Figure 3:
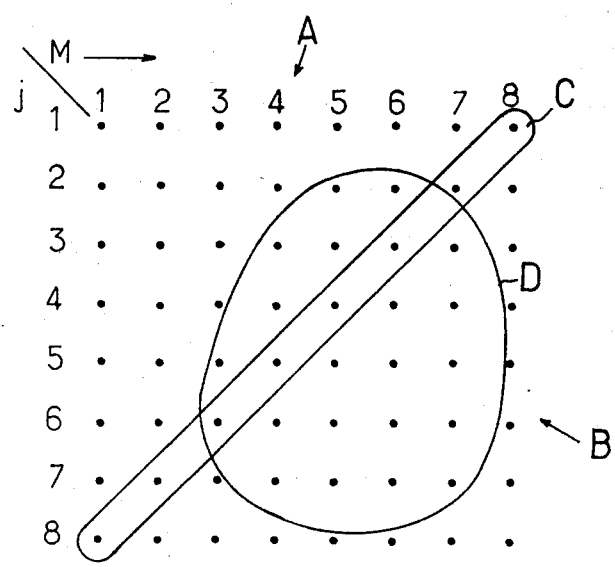
FIG. 3 is a matrix of points illustrating the operation of the echo detector of FIG. 1.

The channeling matrix of FIG. 3 illustrates what values the pair (Iv, j) can take and enables the distinguishing of three domains A, B and C, the domain C containing the set of values of the secondary diagonal of the matrix, the domain A, the set of values located above this diagonal and the domain B the set of values located below. In another form, the domain C represents the set of values for which we have:

$$Iv + j = 9 \text{ domain C} \quad (5)$$

the domain A represents the set of values for which we have:

$$Iv + j < 9 \text{ domain A} \quad (5')$$

and domain B represents the set of values for which we have:

$$Iv + j > 9 \text{ domain B} \quad (5'')$$

In other respects, as mentioned earlier, M varies only between 3 and 8 which implies that the two first columns of the matrix are null. Finally, the value 1 for j corresponds to an amplitude of Xn equal to 32, in the PCM convention where 1 bit has a value of 2 scale units, because below 32, the signal is considered to be null and is treated as a silence.

The simulation on sentences, ranging from 20 to 30 words, has enabled the determination of the domain for real direct speed signal, that is, signals directly emitted by a speaker, in contrast to signals coming from echoes. This domain contains the set of values located slightly inside of curve D shown in FIG. 3.

If we designate by $N_A$, $N_B$, $N_C$ the number of digital words for which, during the operation of coder 15, the pairs of values (Iv, j) applied to circuit 18 are respectively in the domains A, B and C of the matrix of FIG. 3, we can define a ratio IE, which we refer to below as the echo index, such that:

$$IE = \frac{N_A + N_C}{N_B + N_C} \quad (6)$$

this ratio being set over a given time $\theta$, which can be of the order of a few hundred milliseconds.

For a real direct sentence, we are certain to have:

$$IE << 1 \qquad (7)$$

and in fact, during simulation, we observed, in this case IE indexes ranging from $\frac{7}{8}$ to 1/5.

During the coding of an echo signal, all the values of j valid for a direct signal are reduced by one unit, which corresponds to an attenuation of 6 dB, every time that the signal level at the input to the coder of FIG. 2 has been reduced by a 6 dB step. However the voicing indexes Iv have remained the same.

Thus, if the index IE is determined from an echo, we note, with respect to measurements on a direct signal, an increase of the number $N_A$ and a decrease in the number $N_B$. In this case, IE increases and quickly becomes larger than 1.

Figure 4:
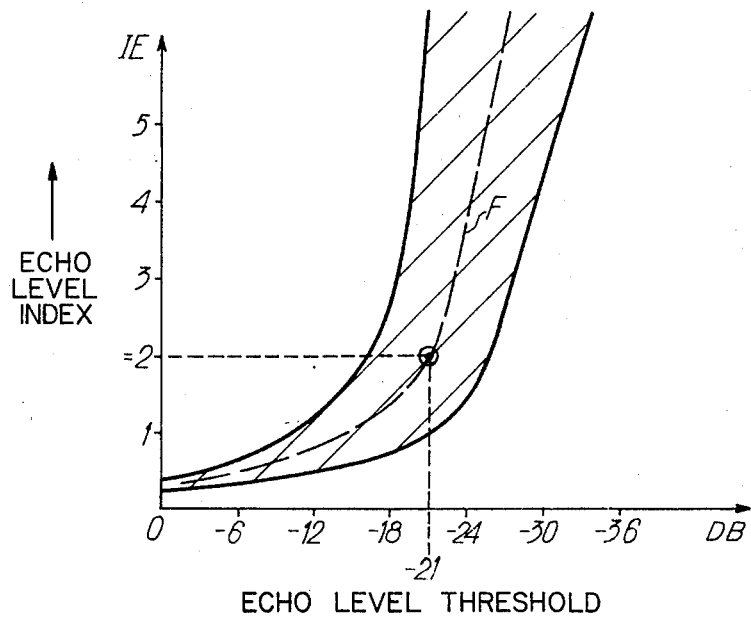
FIG. 4 is a diagram obtained from experiments permitting the illustration of the operation of the echo detector of FIG. 1.

The diagram of FIG. 4 illustrates a hatched zone which corresponds to the variation for the echo index IE, as we increase, at the input to the coder, the attenuation in steps of 6 dB. The dashed line F represents the median line of this zone. We must note that the bending of curve F is located in the proximity of $-20$ dB, which is the average performance limit of the actual circuits featuring the maximum possible level of the echo. An attenuation of $-20$ dB corresponds to an index IE approximately equal to 2 on curve F. We thus conclude that if:

$$IE \geqq 2 \qquad (8)$$

it is an echo at the input of coder 15.

In the block diagram of FIG. 1, the role of circuits 18 and 19 consists of determining the value of IE from the signals M and j generated by the coder 15, in terms of its signals applied from 3.

Figure 5:
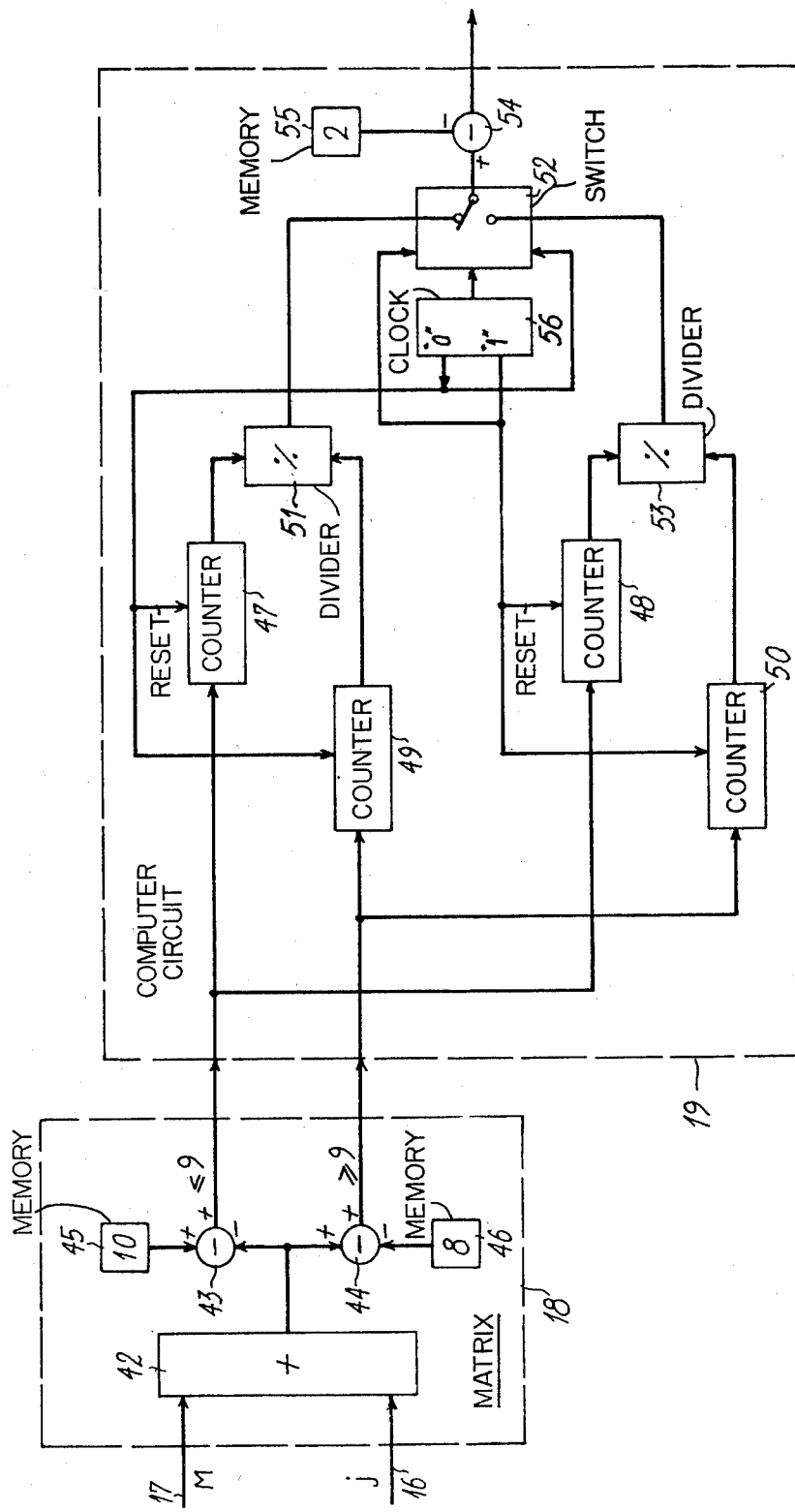
FIG. 5 is a block schematic of computing circuits used in the echo detector of FIG. 1.

An embodiment of circuits 18 and 19 of FIG. 1 is shown in FIG. 5.

In circuit 18, links 16 and 17 are respectively connected to the inputs of an adder 42 whose output is connected, on one hand, to the $-$input of a subtraction circuit 43, and, on the other hand, to the $+$input of another subtraction circuit 44. The $+$input of 43 is connected to the output of memory 45 whose permanent contents are equal to 10. The $-$input of 44 is connected to the output of memory 46 whose permanent contents are equal to 8. The output of 43 yields a signal when the value applied to its $+$input is greater than the value applied to its $-$input. The output of 44 yields a signal under the same conditions.

Circuit 42 executes the sum $I_v + j$ which defines, as indicated by formulae (5, 5' and 5"), to which domain (C, A or B) the last digital word applied to 15 belongs. The output of 43 defines the case where this word belongs to set A or C, while output 44 defines the case where it belongs to set B or C.

The output of 43 is connected, in circuit 19, on one hand, to the signal input of a counter 47 and, on the other hand, to the input of counter 48. Similarly, the output of 44 is connected respectively to the inputs of counters 49 and 50. The output of 47 is connected to the dividend input of a divider 51 whose division input is connected to the output of 49 and whose quotient output is connected to one contact of switch 52. The output of 48 is connected to the dividend input of a divider 53 whose division input is connected to the output of 50 and whose quotient output is connected to another contact of switch 52. Switch 52 permits the connection of either the output of 51 or that of 53 to the $+$input of subtractor 54. The $-$input of subtractor 54 is connected to a memory 55 which contains the value 2 and the output of 54 yields a signal when the value applied to the $+$input is greater or equal to the value applied to its $-$input.

The four counters 47 to 50 are, for example, identical. The CLR (RAZ) inputs of 47 and 49 are connected to the "0" output of clock 56. The CLR (RAZ) inputs of 48 and 50 are connected to the "1" output of 56. The "1" output of 56 is also connected to a control input of 52 which, when activated, places the contacts of 52 in the indicated position, joining 51 to 54. The "0" output is connected to the control input of 52 which inverts its previous state. The period $\theta$ of clock 56 is, as indicated previously of the order of a few hundred milliseconds.

Therefore, during one period $\theta$, the counts of 47 and 49 are divided in 51 and the quotient is applied to subtractor 54, while counters 48 and 50 function simply as accumulators, since the output of 53 is not used. At the start of the next $\theta$ period, the counts of 47 and 49 are returned to zero by 56 and the quotient generated by 53 is now, until the end of this period, applied to 54. Therefore, the outputs of 51 and 52 are used alternately.

Figure 6:
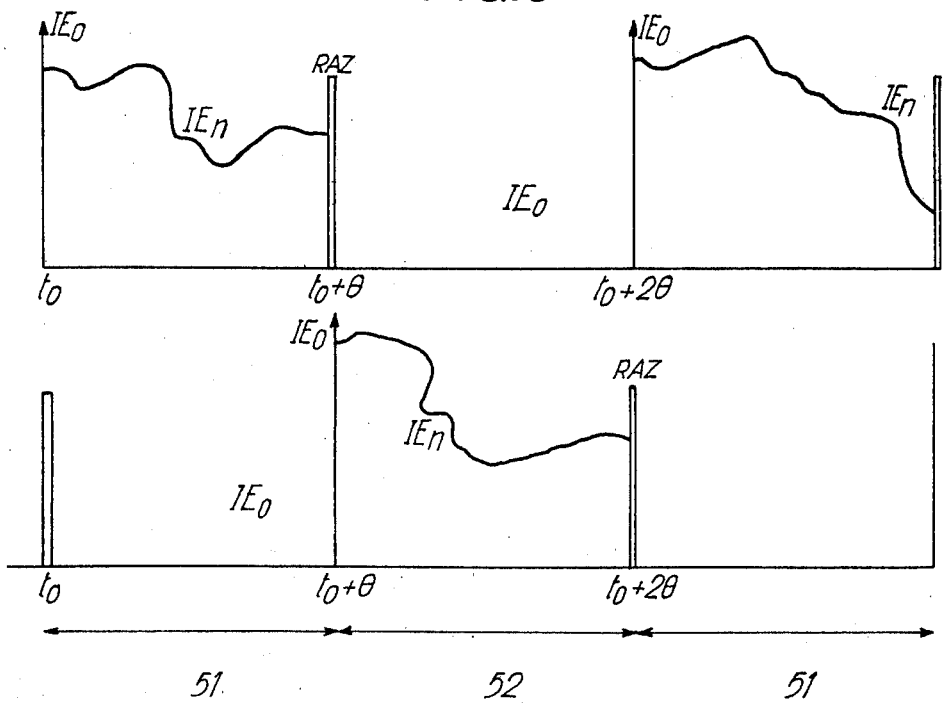
FIG. 6 illustrates timing diagrams permitting the illustration of the operation of the computing circuit of FIG. 5.

The diagrams of FIG. 6 illustrate the operation of circuits 18 and 19. It will appear that counters 47 and 48, which are cleared at different instants, individually form a sum $N_A + N_C$, that is, a numerator from formula (6), while counters 49 and 50, equally cleared at different instants, individually form a sum $N_B + N_C$ that is, a denomination of formula (6).

If we assume that at the initial instant $t_o$ of FIG. 6, switch 52 is in the position indicated by FIG. 5, the value of the output of 51 corresponds the current echo index $IE_n$ which is generated by 54. During this time, counters 48 and 50 accumulate values such that at time $t_o + \theta$, the output of 53 has a value equal to $IE_o$. After this time, the output of 53 is connected to 54 to which it transmits the current echo index.

In fact, on the one hand, the value of the index IE has no sense to determine whether there is echo or not, only if it is established over a number of digital words neither too small, nor too great. The alternate operation obtained in 19, by 52 and the alternate return to zero enables this condition to be met.

Each time subtractor 54 yields a signal, that is when the echo index $IE_n$ which is transmitted to it is greater or equal to 2, this signal acts on contact 2, FIG. 1, to open link 11.

It should be noted that the circuits of FIG. 5 constitute only one embodiment capable of carrying out logical operations which, as seen, are simple. Of course, these logical operations can be realized by using a microprocessor programmed in an appropriate manner.

In other respects if one reconsiders formula (2) above, one can show that, when the signal applied to the coder of FIG. 2 is composed of samples obtained by coding from an analog sinusoidal signal, the average $\overline{\delta}_n$ is a constant value which is a function of the frequency of this sinusoidal signal, and more precisely, one has:

$$\overline{\delta}_n = 4 = \sin^2 \frac{wT}{2} \qquad (9)$$

In fact, assuming a correct coding, that is $x^*_n$ is equal to $x_n$, for a sample $x_n$ of a sinusoidal signal, one has, in using formula (1) which describes the operation of a predictor:

$$x_n = \sin(nwT + \phi) \tag{10}$$

$$\epsilon_{n+1} = 2\sin(nwT+\phi) - \sin[(n-1)wT+\phi] - \sin[(n+1)wT+\phi] \tag{11}$$

$$\epsilon_{n+1} = 4\sin^2\frac{wT}{2}\sin(nwT+\phi) \tag{12}$$

now, considering (10) and (12)

$$\epsilon_{n+1} = 4\sin^2\frac{wT}{2} \cdot x_n \tag{13}$$

From (2), we obtain:

$$\delta_{n+1} = \frac{4\sin^2\frac{wT}{2} \cdot x_n}{X_n \cdot \text{sign}(x^*_n)} \tag{14}$$

Clearly we have:

$$x_n/\text{sign}(x^*_n) = |x_n| \tag{15}$$

and $X_n$ is an average of the absolute value of the sinusoidal of $x^*_n$ (or $x_n$) which results in:

$$X_n = \frac{2}{\pi} \tag{16}$$

It follows that:

$$\delta_{n+1} = \frac{\pi}{2}\left(4\sin^2\frac{wT}{2}\right)|x_n| \tag{17}$$

If, to simplify, we set:

$$\delta = 4\sin^2\frac{wT}{2} \tag{18}$$

we get:

$$\delta_{n+1} = \frac{\pi}{2}\delta|x_n| \tag{19}$$

Under these conditions, if we calculate the average amplitude of the variable $\delta_{n+1}$ defined by (2), which is written as:

$$\bar{\delta}_n = \text{average}(\delta_n) \tag{20}$$

for P terms from n to n−P, we shall have to determine, in (19), the average of the sinusoidal function "absolute value of $x_n$" which is rectified sinusoid. We know that the amplitude average is equal to $2/\pi$.

Therefore, from (19) and (20), we obtain:

$$\bar{\delta}_n = \frac{2}{\pi}\delta\frac{\pi}{2} \tag{21}$$

or:

$$\bar{\delta}_n = \delta = 4\sin^2\frac{wT}{2} \tag{9}$$

It must be noted that the value of $\bar{\delta}_n$ depends only on the frequency of the signal applied to the coder, and not on the amplitude of this signal. In particular, when it is a vocal signal whose voiced components last many hundred milliseconds, this value remains constant over the same time.

Now this value $\bar{\delta}_n$ is available from the coder in FIG. 2, at the output of the delay circuit 35, or to within one sampling period, at the output of the averaging filter 34.

In the block diagram of FIG. 6, we use the property of the value $\bar{\delta}_n$ to detect the presence of an echo and, in particular, to detect the presence of direct speech on the PCM outgoing link 11.

The output of filter 34 of coder 15 is connected, through connector 57 to the first input of comparator 58.

In other respects, in the derivation on the return PCM link 6 a coder 59 is mounted, practically identical to coder 15, in which a filter 34' is provided for, identical to 34, whose output is connected to the input of a delay circuit 60. The circuit 60 has its output connected to the second input of comparator 58, whose output is connected to a supplementary control input of switch 12.

When a vocal signal is received on link 6, circuit 34' of 59 yields a signal $\bar{\delta}_n$ which defines the frequency of this vocal signal. The echo of this received vocal signal which is produced by coupler 4 at its output 10 will have the same frequency as the received signal and, therefore, causes, at the output of 34, the appearance of the same signal $\bar{\delta}_n$. The comparator 58 noting an identity at its two inputs decides that the applied signal at link 11 is an echo and causes switch 12 to open.

Figure 7:
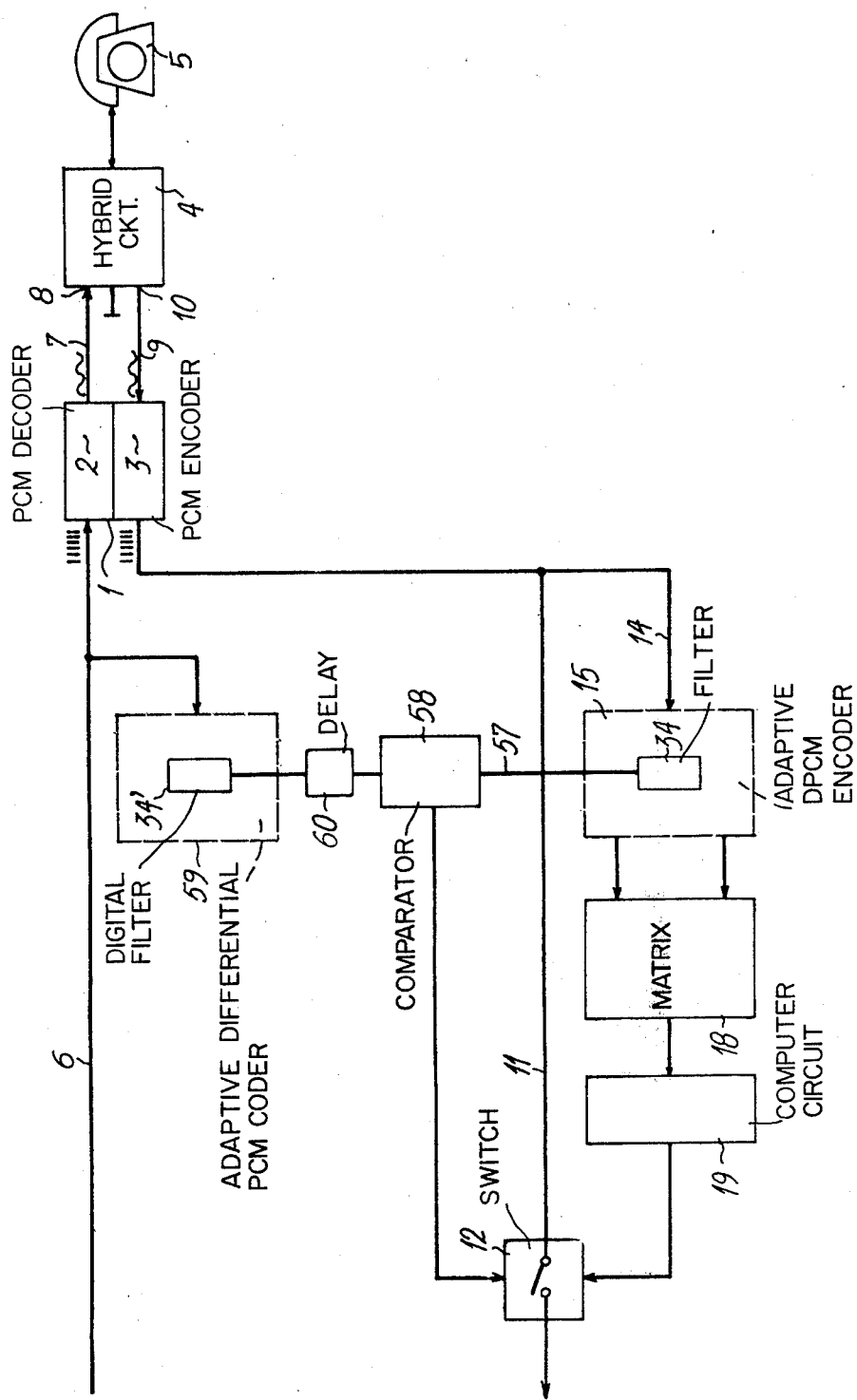
FIG. 7 is a block diagram indicating the set-up of a second embodiment of an echo detector according to the invention.

In FIG. 7, we have provided for a delay circuit 60, between 59 and 58 to take into account the passage of time through decoder 2, the coupler 4 and coder 3, so that the applied signal to the second input of 58 corresponds, in the case of an echo, to the signal applied to the first input. In practice, this delay circuit 60 can generally be suppressed because, as mentioned above, the duration of the vocal signal is relatively long, with regards to the passage time through 2, 4 and 3. In other respects, each filtering circuit 34 and 34' yields the signal $\bar{\delta}_n$ only after having integrated a certain number of samples.

In the above, we have considered using the output of comparator 58 to signal the state of the echo at circuit 12. Now, this state is in other respects equally signalled, as seen earlier, through circuits 18 and 19. In practice, the control inputs of 12 may be connected to a coincidence circuit which opens the contact of 12 only in case of a coincidence of an echo state at its two inputs.

This arrangement presents the advantage of permitting a very rapid detection in the case of two voices, that is, the case where the two correspondents speak at the same time. It is therefore evident, except in rare cases, that the two voice signals are not composed of the same frequencies, which entails an output signal at 34 different from that of 34'.

This distinction is particularly important to detect when the speaker at station 5 begins to speak. In fact, given the operating mode of circuit 19, it takes a certain amount of time for his voice to pass from an echo state to that of speech. However, the value of the output of 34 will diverge more rapidly from that of the output of filter 34'.

We must again note that, if the transmission over the outgoing link 11 and return link 6 is in differential PCM, the coder circuits 15 may be found included directly in those of coder 3, while those of coder 59 may be found included in those of decoder 2, since, in this type of transmission, decoder 2 has practically every circuit of decoder 3 and, in particular, those common to 15 and 59.

Of course, the above assumes that the coders and decoders contain linear second coder predictors operating on reconstituted, normalized, and centered variables, or else a sinusoidal predictor, such as described in the French patent application having national registration number 78 36601, applied for by the present applicant on Dec. 21, 1978 and entitled "Predictor for Digital Differential Signal Coder and Decoder".

We recall that the sinusoidal predictor described in the French patent application mentioned above delivers a predicted signal $x_{n+1}$ determined by formula:

$$\tilde{x}_{n+1} = 2x^*_n - x^*_{n-1} - \overline{\delta}_n x^*_n \qquad (22)$$

where $\overline{\delta}_n$ is a coefficient calculated through a series of calculations which utilize formula (20) above, as well as formulae (2) and (1). In such a predictor, we therefore have a coefficient $\overline{\delta}_n$ which permits its use in a system such as that described in FIG. 7. In other respects, we have $X_n$, that is in practice j, and, since such a sinusoidal predictor is normally used in a PCM differential coder, we have in it the coefficient which defines the number of binary elements per transmitted word, that is, a coefficient which permits the definition of a voicing index of type Iv. It therefore appears that from these coefficients a similar matrix as that of FIG. 3 can be defined and, so, processing as described with reference to FIGS. 5 and 6.

The embodiments of the invention in which an exclusive property or privilege is claimed are defined as follows:

1. An echo detector, comprising circuit means for digital differential coding of incoming signals which can include an echo signal including means for generating an error signal responsive to an incoming signal and a predicted signal, first means for dividing said error signal by an average value of a certain number of samples of previously received incoming signals, the sign of said average being the same as the sign of the second-last received sample, second means for dividing the quotient obtained by said first dividing means by the average value of a certain number of such previously computed quotients, first logic circuit means for determining the logarithm to the base 2 of the average value for the incoming signal samples, and second logic circuit means for determining the logarithm to the base 2 of the average value of the quotients, for which only the integer portion is kept, a set of forming two values for each sample for defining one point in a matrix of points, said echo detector further including first counter means for counting a certain number of sets of two values for which the corresponding points are above or on the secondary diagonal of the matrix, second counter means for counting simultaneously the number of sets of values for which the corresponding points are below or on said secondary diagonal, divider means for carrying out the quotient of the count from the first and the second counter, and comparing means for comparing said quotient to a predetermined value to determine if it is greater than said predetermined value, whereby a determination that said quotient is greater indicates that the incoming signal is an echo signal and not an information signal.

2. An echo detector in accordance with claim 1 characterized in that said predetermined value is equal to 2.

3. An echo detector in accordance with claim 1 characterized in that said first and second counter means are comprised of two pairs of first and second counter means which are used alternately, said divider means including first and second dividers for the respective pairs of said counter means, means for comparing the quotient of one of said pairs of counter means with said predetermined value during a predetermined period of time while the counters of the second pair accumulate values after having been reset to zero at the beginning of said time period, and means effective during a second period for comparing the quotient of the second pair while the counters of the first pair accumulate values after having been reset to zero.

4. An echo detector in accordance with claim 2 characterized in that said first and second counter means are comprised of two pairs of first and second counters which are used alternately, said divider means including first and second dividers for the respective pairs of said counters means for comparing the quotient of one of said pairs of counters with said predetermined value during a predetermined period of time while the counters of the second pair accumulate values after having been reset to zero at the beginning of said time period, and means effective during a second period for comparing the quotient of the second pair while the counters of the first pair accumulate values after having been reset to zero.

* * * * *

UNITED STATES PATENT AND TRADEMARK OFFICE
CERTIFICATE OF CORRECTION

PATENT NO. : 4,360,713

DATED : November 23, 1982

INVENTOR(S) : Joel Soumagne

It is certified that error appears in the above-identified patent and that said Letters Patent is hereby corrected as shown below:

On the title page, inventor name should read

-- Joel Soumagne --.

Signed and Sealed this

Twelfth Day of April 1983

[SEAL]

Attest:

GERALD J. MOSSINGHOFF

Attesting Officer     Commissioner of Patents and Trademarks